(12) United States Patent
Tochigi et al.

(10) Patent No.: US 8,345,202 B2
(45) Date of Patent: Jan. 1, 2013

(54) ANTIGLARE FILM, MANUFACTURING METHOD THEREOF, AND TRANSMISSIVE LIQUID CRYSTAL DISPLAY

(75) Inventors: Yusuke Tochigi, Tokyo (JP); Kae Tochigi, Tokyo (JP); Takahiro Morinaga, Tokyo (JP)

(73) Assignee: Toppan Printing Co., Ltd., Tokyo (JP)

( * ) Notice: Subject to any disclaimer, the term of this patent is extended or adjusted under 35 U.S.C. 154(b) by 114 days.

(21) Appl. No.: 12/973,923

(22) Filed: Dec. 21, 2010

(65) Prior Publication Data

US 2011/0085115 A1     Apr. 14, 2011

Related U.S. Application Data

(63) Continuation of application No. PCT/JP2009/066559, filed on Sep. 24, 2009.

(30) Foreign Application Priority Data

Sep. 25, 2008 (JP) .................................. 2008-246818

(51) Int. Cl.
*G02F 1/1335* (2006.01)
(52) U.S. Cl. ....................................................... 349/137
(58) Field of Classification Search .................... 349/137
See application file for complete search history.

(56) References Cited

U.S. PATENT DOCUMENTS

| | | | |
|---|---|---|---|
| 5,387,463 A | 2/1995 | Nakamura et al. | |
| 6,111,699 A | 8/2000 | Iwata et al. | |
| 6,217,176 B1 | 4/2001 | Maekawa | |
| 6,343,865 B1 | 2/2002 | Suzuki | |
| 2002/0150722 A1 | 10/2002 | Suzuki | |
| 2008/0212005 A1* | 9/2008 | Miyauchi et al. ............. | 349/137 |
| 2008/0286527 A1 | 11/2008 | Haga et al. | |
| 2009/0086326 A1 | 4/2009 | Hamamoto et al. | |

FOREIGN PATENT DOCUMENTS

| | | |
|---|---|---|
| JP | 06-18706 A | 1/1994 |
| JP | 11-160505 A | 6/1999 |
| JP | 11-305010 A | 11/1999 |

(Continued)

OTHER PUBLICATIONS

International Search Report issued in corresponding Application No. PCT/JP2009/066559, date of mailing Dec. 15, 2009.

*Primary Examiner* — Wen-Ying P Chen
(74) *Attorney, Agent, or Firm* — Judge Patent Associates

(57) ABSTRACT

An antiglare film includes a transparent substrate, and an antiglare layer formed on the transparent substrate. The antiglare layer includes a binder matrix and acrylic-styrene copolymer particles, and the binder matrix includes an acrylic material having a hydroxyl group. A quotient $R_A/H$, which is obtained by dividing the average diameter $R_A$ of the acrylic-styrene copolymer particles by the average thickness H of the antiglare layer, is within a range of 0.30 to 0.80. A product in $|n_A-n_M| \times w_A \times H$, which is the product of: the absolute value $|n_A-n_M|$ obtained by subtracting the average refractive index $n_M$ of the binder matrix from the refractive index $n_A$ of the acrylic-styrene copolymer particles; the content $w_A$ of the acrylic-styrene copolymer particles when the content $w_M$ of the binder matrix in the antiglare layer is 100 parts by weight; and the average thickness H of the antiglare layer, is within a range of 0.70 to 3.00.

20 Claims, 2 Drawing Sheets

FOREIGN PATENT DOCUMENTS

| | | |
|---|---|---|
| JP | 2000-180611 A | 6/2000 |
| JP | 2000-338310 A | 12/2000 |
| JP | 2002-207109 A | 7/2002 |
| JP | 2003-004903 A | 1/2003 |
| JP | 2003-260748 A | 9/2003 |
| JP | 2004-004777 A | 1/2004 |
| JP | 2007-41533 A | 2/2007 |
| JP | 2007-133384 A | 5/2007 |
| JP | 2007-193017 A | 8/2007 |
| JP | 2008-233870 A | 10/2008 |

* cited by examiner (a)

(b)

ANTIGLARE FILM, MANUFACTURING METHOD THEREOF, AND TRANSMISSIVE LIQUID CRYSTAL DISPLAY

CROSS-REFERENCE TO RELATED APPLICATION

This application is a U.S. continuation application filed under 35 USC 111(a) claiming benefit under 35 USC 120 and 365(c) of PCT application JP2009/066559, filed Sep. 24, 2009, which claims priority to Japan Patent Application Serial No. 2008-246818, filed on Sep. 25, 2008. The foregoing applications are hereby incorporated herein by reference.

BACKGROUND OF THE INVENTION

1. Field of the Invention

The present invention generally relates to an antiglare film, a manufacturing method thereof, and a transmissive liquid crystal display. More particularly, the present invention relates to: an antiglare film that is provided on a surface of a window, or on a surface of a display such as a liquid crystal display (LCD), a CRT display, an electroluminescent display (ELD), a plasma display (PDP), a surface-conduction electron-emitter display (SED) or a field emission display (FED); a manufacturing method thereof, and a transmissive liquid crystal display.

2. Description of the Background Art

In the field of displays such as liquid crystal displays, CRT displays, EL displays, and plasma displays, an antiglare film having a concave-convex structure on its surface is provided on the display surface in order to prevent a reduction of visibility caused by reflection of external light on the display surface during viewing.

The following are some techniques for manufacturing an antiglare film having a concave-convex structure on its surface: a technique of forming a concave-convex structure on a surface of an antiglare film by embossing; and a technique of applying a coating liquid, which is obtained by mixing particles into a binder matrix forming material and dispersing the particles in the binder matrix, on a transparent substrate to form a concave-convex structure on an antiglare film. Since the antiglare film thus formed is provided with the concave-convex structure on its surface, external light incident on the antiglare film is scattered by the concave-convex structure on the surface, and thereby an image of the external light becomes smudgy. That is, a reduction of visibility caused by reflection of the external light on the display surface can be prevented.

In the antiglare film having, on its surface, concavities and convexities formed by embossing, the convexities and concavities on the surface can be controlled by managing a pattern of an embossing roll. Therefore, reproducibility is good. However, if the embossing roll has a defect or a foreign matter attached thereto, a defect will periodically appear on the antiglare film that extends from the roll.

Various forms of antiglare films, each having an antiglare layer in which particles are dispersed in a binder matrix, have been disclosed in patent documents. An antiglare film using a binder matrix and particles for forming an antiglare layer, which is disclosed in Patent Document 1, requires less process steps for production and therefore can be produced at a lower cost as compared with the above-described antiglare film produced using the emboss processing (refer to Patent Document 1).

Patent Document 2 discloses a technique using a combination of a binder matrix resin, spherical particles, and irregular-shape particles for forming an antiglare layer (refer to Patent Document 2). Patent Document 3 discloses a technique using a binder matrix resin and a plurality of kinds of particles having different diameters for forming an antiglare layer (refer to Patent Document 3). Patent Document 4 discloses a technique in which, in an antiglare film having concavities and convexities on its surface, the cross-sectional area of the concavities is specified (refer to Patent Document 4).

Furthermore, Patent Document 5 discloses a technique of providing an antiglare property by using a combination of internal scattering and surface scattering of an antiglare layer, that is, a technique in which the internal haze value (cloudiness) of the antiglare layer is set to be in the range of 1% to 15% and the surface haze value (cloudiness) thereof is set to be in the range of 7% to 30% (refer to Patent Document 5). Patent Document 6 discloses a technique for forming an antiglare layer, in which a binder resin and particles having diameters in the range of 0.5 µm to 5 µm are used, a difference in the refractive index between the binder resin and the particles is set to be in the range of 0.02 to 0.2, and the particles are blended in an amount greater than 10 parts by weight and less than 30 parts by weight into 100 parts by weight of the binder resin (refer to Patent Document 6), Patent Document 7 discloses a technique for forming an antiglare layer, in which a binder resin and particles having diameters in the range of 1 µm to 5 µm are used, a difference in the refractive index between the binder resin and the particles is set to be in the range of 0.05 to 0.15, and a solvent to be used, surface roughness, and the like are set within predetermined ranges (refer to Patent Document 7). Patent Document 8 discloses a technique in which a binder resin and a plurality of kinds of particles are used, and a difference in the refractive index between the binder resin and the particles is set to be in the range of 0.03 to 0.2 (refer to Patent Document 8). Patent Document 9 discloses a technique in which, in order to prevent a reduction in contrast, hue variation, and the like when a viewing angle is changed, the surface haze value (cloudiness) at the surface of an antiglare film is set to be 3 or more, and a difference between the haze value in the normal direction and the haze value in the direction at ±60° is set to 4 or less (refer to Patent Document 9).

As described above, antiglare films of various configurations have been discovered to attain a variety of results. The performance of an antiglare film used on the front surface of a display varies depending on the type of the display. In other words, selection of an appropriate antiglare film depends on the resolution of the display or intended use of the display. Therefore, a variety of antiglare films are required according to the intended purposes.

The antiglare films disclosed in Patent Documents 1 to 9 are provided on the surfaces of liquid crystal displays for notebook PCs, desktop PCs, or televisions. However, in manufacturing of antiglare films intended to be used on only the display surfaces of televisions, a lot of unnecessary parts that are useless because of the sizes are caused by chamfering, which results in an increase in cost.

Therefore, in recent years, there has been increased demand for an antiglare film that can be used on the display surface of any of notebook PCs, desktop PCs, and televisions.

In the related art, however, sufficient contrast cannot be obtained if an antiglare film intended for notebook PCs or desktop PCs is used on a display of a television. Conversely, if an antiglare intended for television displays is used for a notebook PC or a desktop PC, a phenomenon of image flickering (glare) cannot be sufficiently prevented.

Furthermore, an antiglare film intended for notebook PCs or desktop PCs may require a high level of glare suppression, because a user (observer) continuously observes and stares at a display surface for long hours. On the other hand, an antiglare film intended for televisions may require image display at a high contrast when provided on a display surface in order to prevent sharpness of the image from deteriorating.

Patent Document 1: Japanese Laid-Open Patent Publication No. 6-18706
Patent Document 2: Japanese Laid-Open Patent Publication No. 2003-260748
Patent Document 3: Japanese Laid-Open Patent Publication No. 2004-004777
Patent Document 4: Japanese Laid-Open Patent Publication No. 2003-004903
Patent Document 5: Japanese Laid-Open Patent Publication No. 11-305010
Patent Document 6: Japanese Laid-Open Patent Publication No. 2002-207109
Patent Document 7: Japanese Laid-Open Patent Publication No. 2000-338310
Patent Document 8: Japanese Laid-Open Patent Publication No. 2000-180611
Patent Document 9: Japanese Laid-Open Patent Publication No. 11-160505

SUMMARY OF THE INVENTION

Therefore, an object of the present invention is to provide: an antiglare film having an antiglare property which is a function of the antiglare film, allowing display of an image at a high contrast, and suppressing glare at a high level; a manufacturing method thereof; and a transmissive liquid crystal display.

A first aspect of the present invention is directed to an antiglare film including a transparent substrate, and an antiglare layer formed on the transparent substrate. The antiglare layer has a concave-convex structure on one side thereof, which side is opposite the side at which the antiglare layer is formed on the transparent substrate. The antiglare layer includes a binder matrix and acrylic-styrene copolymer particles, and the binder matrix includes an acrylic material having a hydroxyl group. A quotient $R_A/H$, which is obtained by dividing the average diameter $R_A$ of the acrylic-styrene copolymer particles by the average thickness H of the antiglare layer, is within a range of 0.30 to 0.80. A product $|n_A-n_M| \times w_A \times H$, which is the product of: the absolute value $|n_A-n_M|$ obtained by subtracting the average refractive index $n_M$ of the binder matrix from the refractive index $n_A$ of the acrylic-styrene copolymer particles; the content $w_A$ of the acrylic-styrene copolymer particles when the content $w_M$ of the binder matrix in the antiglare layer is 100 parts by weight; and the average thickness H of the antiglare layer, is within a range of 0.70 to 3.00.

According to a second aspect of the present invention, in the antiglare film according to the first aspect, the average thickness H of the antiglare layer is within a range of 3 μm to 30 μm.

According to a third aspect of the present invention, in the antiglare film according to the first or second aspect, the acrylic material having a hydroxyl group is pentaerythritol triacrylate, and the antiglare layer includes 18 parts by weight or more of the pentaerythritol triacrylate relative to 100 parts by weight of the binder matrix.

A fourth aspect of the present invention is directed to a method for manufacturing an antiglare film, including: preparing a transparent substrate; forming a coating film by applying, on the transparent substrate, a coating liquid for forming an antiglare layer, which coating liquid includes a binder matrix forming material and acrylic-styrene copolymer particles; and curing the binder matrix forming material to form the antiglare layer. A quotient $R_A/H$, which is obtained by dividing the average diameter $R_A$ of the acrylic-styrene copolymer particles by the average thickness H of the antiglare layer, is within a range of 0.30 to 0.80. A product $|n_A-n_M| \times w_A \times H$, which is the product of: the absolute value $|n_A-n_M|$ obtained by subtracting the average refractive index $n_M$ of the binder matrix from the refractive index $n_A$ of the acrylic-styrene copolymer particles; the content $w_A$ of the acrylic-styrene copolymer particles when the content $w_M$ of the binder matrix in the antiglare layer is 100 parts by weight; and the average thickness H of the antiglare layer, is within a range of 0.70 to 3.00, the product $|n_A-n_M| \times w_A \times H$.

According to a fifth aspect of the present invention, in the method for manufacturing an antiglare film according to the fourth aspect, the binder matrix includes pentaerythritol triacrylate, and the pentaerythritol triacrylate accounts for 18 parts by weight or more relative to 100 parts by weight of the binder matrix constituting a part of the antiglare layer.

According to a sixth aspect of the present invention, in the method for manufacturing an antiglare film according to the fourth or fifth aspect, the coating liquid for forming the antiglare layer is applied by using a die coater.

A seventh aspect of the present invention is directed to a transmissive liquid crystal display having a backlight side and an observer side, and including: the antiglare film according to any of the first to third aspects, a first polarizing plate, a liquid crystal cell, a second polarizing plate, and a backlight unit in this order from the observer side to the backlight side. The antiglare layer of the antiglare film is provided at the observer side.

An eighth aspect of the present invention is directed to an antiglare polarizing plate including: the antiglare film according to any of the first to third aspects; a polarizing layer on the side of the transparent substrate that is opposite the side at which the antiglare layer is formed; and a second transparent substrate on the polarizing layer.

A ninth aspect of the present invention is directed to a transmissive liquid crystal display having a backlight side and an observer side, and including: the antiglare polarizing plate according to the eighth aspect, a liquid crystal cell, a second polarizing plate, and a backlight unit in this order from the observer side to the backlight side. The antiglare layer of the antiglare polarizing plate is provided on the observer side.

According to the present invention, it is possible to provide: an antiglare film having an antiglare property which is a function of the antiglare film, providing a high contrast, and suppressing glare at a high level; an antiglare polarizing plate; a manufacturing method thereof; and a transmissive liquid crystal display.

DESCRIPTION OF THE PREFERRED EMBODIMENTS

Figure 1:
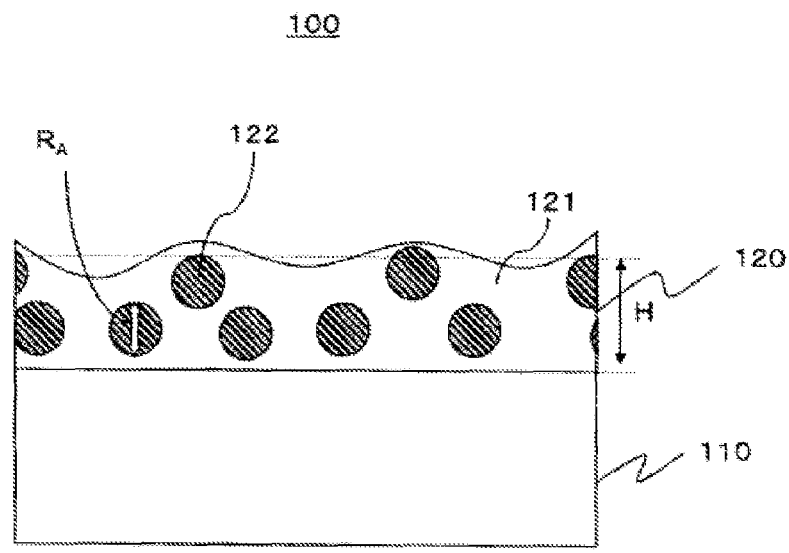
FIG. 1 shows a schematic cross-sectional view of an antiglare film according to Embodiment 1 of the present invention.

Hereinafter, embodiments of the present invention will be described with reference to the drawings. In the embodiments, the same components are assigned the same reference numerals, and redundant description is omitted.

FIG. 1 shows a schematic cross-sectional view of an antiglare film according to Embodiment 1 of the present invention. As shown in FIG. 1, the antiglare film 100 according to Embodiment 1 of the present invention includes an antiglare layer 120 on a first transparent substrate 110. The antiglare layer 120 of the antiglare film 100 according to Embodiment 1 of the present invention includes a binder matrix 121 and acrylic-styrene copolymer particles 122.

The antiglare film 100 according to Embodiment 1 of the present invention is characterized as follows. In the antiglare layer 120, the acrylic-styrene copolymer particles 122 are contained in the binder matrix 121, and the binder matrix 121 includes an acrylic material having a hydroxyl group. A quotient $R_A/H$, which is obtained by dividing the average diameter $R_A$ of the acrylic-styrene copolymer particles 122 by the average thickness H of the antiglare layer 120, is within a range of 0.30 to 0.80 (specifically, a range of not less than 0.30 and not greater than 0.80). A product $|n_A-n_m| \times w_A \times H$ is obtained by the product of: the absolute value $|n_A-n_M|$ obtained by subtracting the average refractive index $n_M$ of the binder matrix 121 from the refractive index $n_A$ of the acrylic-styrene copolymer particles 122; the content $w_A$ of the acrylic-styrene copolymer particles 122 when the content $w_M$ of the binder matrix 121 of the antiglare layer 120 is 100 parts by weight; and the average thickness H of the antiglare layer 120. The product $|n_A-n_m| w_A \times H$ is within a range of 0.70 to 3.00 (specifically, a range of not less than 0.70 and not greater than 3.00).

The antiglare film 100 according to Embodiment 1 of the present invention has a concave-convex structure on the surface of the antiglare layer 120. Specifically, as shown in FIG. 1, the antiglare layer 120 has a concave-convex structure on the side which is opposite the side at which the antiglare layer 120 is formed on the transparent substrate 110. The concave-convex structure scatters external light incident on the surface of the antiglare film 100, which causes an image of the external light reflected on the surface of the antiglare film 100 to become smudgy. In the antiglare, layer 120 including the binder matrix 121 and the particles, the concavities and convexities on the surface of the antiglare layer 120 are formed due to individual particles and/or agglutinated particles.

However, if the particles are excessively agglutinated, excessive concavities and convexities may be formed on the surface of the antiglare layer, which causes white blurring.

In the antiglare film 100 having the concave-convex structure on the surface of the antiglare layer 120, by increasing the size of the convexities formed on the surface of the antiglare layer 120, an image of external light incident thereon can be made smudgy, and thus an excellent antiglare property can be obtained. However, if the concavities and convexities on the surface of the antiglare layer 120 are excessively large, a phenomenon called "white blurring" occurs, in which the display is discolored when illumination of a fluorescent lamp or the like is reflected on the display. Such white blurring is caused by the illumination incident on the surface of the antiglare layer 120 being excessively scattered due to the excessive concavities and convexities formed on the surface of the antiglare layer 120. The white blurring causes a reduction in contrast.

The inventors discovered that excessive agglutination of particles in the binder matrix 121 can be prevented by using, as the particles, the acrylic-styrene copolymer particles 122 and adding an acrylic material having a hydroxyl group into the binder matrix 121. Consequently, white blurring is suppressed, and a reduction in contrast is substantially reduced.

The reason is as follows. By using, as the particles, the acrylic-styrene copolymer particles 122 and adding an acrylic material having a hydroxyl group into the binder matrix 121, an interaction between a carbonyl group at an acrylic site of the acrylic-styrene copolymer particles 122 and the hydroxyl group in the binder matrix 121 prevents the particles from being excessively agglutinated.

The antiglare film 100 of the embodiment of the present invention is characterized in that a quotient $R_A/H$, which is obtained by dividing the average diameter $R_A$ of the acrylic-styrene copolymer particles 122 by the average thickness H of the antiglare layer 120, is within a range of 0.30 to 0.80.

If the quotient $R_A/H$ obtained by dividing the average diameter $R_A$ of the acrylic-styrene copolymer particles 122 by the average thickness H of the antiglare layer 120 is less than 0.30, it is difficult to form sufficient concavities and convexities on the surface of the antiglare layer 120, and hence the antiglare property is deteriorated. In this case, reflection of external light cannot be sufficiently avoided. On the other hand, if the quotient $R_A/H$ obtained by dividing the average diameter $R_A$ of the acrylic-styrene copolymer particles 122 by the average thickness H of the antiglare layer 120 exceeds 0.80, large convexities are formed on the surface of the antiglare layer 120, and the surface concavities and convexities of the antiglare layer 120 become excessive. In this case, white blurring occurs, which causes a reduction in contrast. Thus, the antiglare film 100 of the embodiment of the present invention realizes a good balance between the antiglare property and the contrast, by setting the quotient $R_A/H$ obtained by dividing the average diameter $R_A$ of the acrylic-styrene copolymer particles 122 by the average thickness H of the antiglare layer 120, within a range of 0.30 to 0.80.

In the embodiment of the present invention, the average thickness H of the antiglare layer 120 is an average thickness of the antiglare layer 120 having the surface concavities and convexities. The average thickness H of the antiglare layer 120 can be obtained by, for example, an electronic micrometer or an automated microfigure measuring instrument. The average diameter $R_A$ of the acrylic-styrene copolymer particles 122 can be obtained by, for example, a light scattering particle size distribution analyzer.

In the antiglare layer 120 of the embodiment of the present invention, a product $|n_A-n_M| \times w_A \times H$ is obtained by the product of: the absolute value $|n_A-n_M|$ obtained by subtracting the average refractive index $n_M$ of the binder matrix 121 from the refractive index $n_A$ of the acrylic-styrene copolymer particles 122; the content $w_A$ of the acrylic-styrene copolymer particles 122 when the content $w_M$ of the binder matrix 121 of the antiglare layer 120 is 100 parts by weight; and the average thickness H of the antiglare layer 120. The product $|n_A-n_M| \times w_A \times H$ is within a range of 0.70 to 3.00.

If, in the antiglare layer 120, the product $|n_A-n_M| \times w_A \times H$, which is obtained by the product of: the absolute value $|n_A-n_M|$ obtained by subtracting the average refractive index $n_M$ of the binder matrix 121 from the refractive index $n_A$ of the acrylic-styrene copolymer particles 122; the content $w_A$ of the acrylic-styrene copolymer particles 122 when the content $w_M$ of the binder matrix 121 of the antiglare layer 120 is 100 parts by weight; and the average thickness H of the antiglare layer 120, is less than 0.70, the light diffusing function in the antiglare layer 120 becomes insufficient, which causes a decrease in the degree of reducing glare. On the other hand, if, in the antiglare layer 120, the product $|n_A-n_M|\times w_A \times H$, which is obtained by the product of: the absolute value $|n_A-n_M|$ obtained by subtracting the average refractive index $n_M$ of the binder matrix 121 from the refractive index $n_A$ of the acrylic-styrene copolymer particles 122; the content $w_A$ of the acrylic-styrene copolymer particles 122 when the content $w_M$ of the binder matrix 121 of the antiglare layer 120 is 100 parts by weight; and the average thickness H of the antiglare layer 120, exceeds 3.00, the light diffusing function becomes excessively strong. In this case, the front luminance is increased when black is displayed, resulting in a reduction in contrast.

The inventors discovered that, in the antiglare layer 120, the product $|n_A-n_M|\times w_A\times H$, which is obtained by the product of: the absolute value $|n_A-n_M|$ obtained by subtracting the average refractive index $n_M$ of the binder matrix 121 from the refractive index $n_A$ of the acrylic-styrene copolymer particles 122; the content $w_A$ of the acrylic-styrene copolymer particles 122 when the content $w_M$ of the binder matrix 121 of the antiglare layer 120 is 100 parts by weight; and the average thickness H of the antiglare layer 120, represents the light diffusing function in the antiglare layer 120 with great accuracy. That is, when the product $|n_A-n_M|\times w_A\times H$, which is obtained by the product of: the absolute value $|n_A-n_M|$ obtained by subtracting the average refractive index $n_M$ of the binder matrix 121 from the refractive index $n_A$ of the acrylic-styrene copolymer particles 122; the content $w_A$ of the acrylic-styrene copolymer particles 122 when the content $w_M$ of the binder matrix 121 of the antiglare layer 120 is 100 parts by weight; and the average thickness H of the antiglare layer 120, is set within a range of 0.70 to 3.00, the light diffusing function inside the antiglare layer 120 can be controlled precisely, resulting in an antiglare film 100 that realizes both a high contrast display function and an excellent glare preventing function.

In the embodiment of the present invention, the refractive index $n_M$ of the binder matrix 121 is measured in a film formed of the binder matrix 121. That is, the refractive index $n_M$ of the binder matrix 121 that forms part of the antiglare layer 120 is measured excluding the acrylic-styrene copolymer particles 122. The refractive index $n_M$ of the binder matrix 121 and the refractive index $n_A$ of the acrylic-styrene copolymer particles 122 can be obtained by the Becke line detecting method (immersion method).

In the embodiment of the present invention, the content $w_M$ of the binder matrix 121 in the antiglare layer 120 is the total weight of the binder matrix 121 obtained by subtracting the total weight of the acrylic-styrene copolymer particles 122 from the total weight of the antiglare layer 120, and it is represented as 100 parts by weight.

The content $w_A$ of the acrylic-styrene copolymer particles 122 when the content $w_M$ of the hinder matrix 121 in the antiglare layer is 100 parts by weight is the total weight of the acrylic-styrene copolymer particles 122 in the antiglare layer 120 when the total weight of the binder matrix 121 in the antiglare layer is 100 parts by weight, and it is represented by parts by weight.

The inventors discovered the following. When the antiglare film 100 satisfies the following conditions: the antiglare layer 120 including the acrylic-styrene copolymer particles 122 in the binder matrix 121; the binder matrix 121 including an acrylic material having a hydroxyl group; the quotient $R_A H$, which is obtained by dividing the average diameter $R_A$ of the acrylic-styrene copolymer particles 122 by the average thickness H of the antiglare layer 120, being within a range of 0.30 to 0.80; and the product $|n_A-n_M|\times w_A\times H$, which is obtained by the product: the absolute value $|n_A-n_M|$ obtained by subtracting the average refractive, index $n_M$ of the binder matrix 121 from an refractive index $n_A$ of the acrylic-styrene copolymer particles 122; the content $w_A$ of the acrylic-styrene copolymer particles 122 when the content $w_M$ of the binder matrix 121 in the antiglare layer 120 is 100 parts by weight; and the average thickness H of the antiglare layer 120, being within a range of 0.70 to 3.00; it is possible to obtain an antiglare film 100 having an antiglare property and a high contrast display function that is applicable to any of the surfaces of notebook PCs, desktop PCs, and television displays, and suppressing glare at a high level. This, it is possible to realize an antiglare film 100 that is favorably applicable to any of the surfaces of notebook PCs, desktop PCs, and television displays, and a transmissive liquid crystal display using the antiglare film 100. The antiglar film 100 of the embodiment of the present invention, which satisfies the above-mentioned requirements, has an antiglare property, provides a high contrast, and suppresses glare at a high level.

The antiglare layer 120 of the antiglare film 100 of the embodiment of the present invention is characterized in that the acrylic material having a hydroxyl group, which is included in the binder matrix 121, is pentaerythritol triacrylate, and the antiglare layer 120 includes 18 parts by weight or more of pentaerythritol triacrylate when the binder matrix 121 included in the antiglare layer 120 is 100 parts by weight. If the content of pentaerythritol triacrylate relative to 100 parts by weight of the binder matrix 121 is less than 18 parts by weight, the antiglare film 100 having an antiglare property and a high contrast and suppressing glare at a high level cannot be obtained.

Further, in the antiglare film 100 of the embodiment of the present invention, it is preferred that the average thickness H of the antiglare layer 120 be within a range of 3 μm to 30 μm (specifically, a range of not less than 3 μm and not greater than 30 μm). If the average thickness H of the antiglare layer 120 is less than 3 μm, the resultant antiglare film 100 fails to have a sufficient hardness to provide the antiglare film 100 on a display surface. On the other hand, if the average thickness H of the antiglare layer 120 exceeds 30 μm, the degree of curling of the resultant antiglare film 100 is increased, which makes the antiglare film 100 unsuitable for a process of providing the antiglare film 100 on a display surface. In addition, since a large amount of material is required, the cost will be increased. More preferably, the average thickness H of the antiglare layer 120 is within a range of 4 μm to 20 μm (specifically, a range of not less than 4 μm and not greater than 20 μm).

If necessary or desired, the antiglare film 100 of the embodiment of the present invention may be provided with functional layers having an antireflection property, an antistatic property, an antifouling property, an electromagnetic shielding property, an infrared absorption property, an ultraviolet absorption property, a color compensation property, and the like. Examples of such functional layers include an antireflection layer, an antistatic layer, an antifouling layer, an electromagnetic shielding layer, an infrared absorption layer, an ultraviolet absorption layer, a color compensation layer, and the like. A single functional layer may be provided, or a plurality of functional layers may be provided. A single functional layer may have a plurality of functions, like an antireflection layer having both an antireflection property and an antifouling property. The functional layers may be arranged between the first transparent substrate 110 and the antiglare layer 120, or on the antiglare layer 120. In the embodiment of the present invention, a primer layer, an adhesive layer, or the like may be provided between any adjacent layers in order to improve the interlayer adhesion.

Hereinafter, a method for manufacturing an antiglare film 100 according to an embodiment of the present invention will be described. The method for manufacturing an antiglare film 100 of the embodiment of the present invention includes a process of forming a coating film on the first transparent substrate 110 by applying a coating liquid for forming the antiglare layer 120 on the first transparent substrate 110. The coating liquid includes acrylic-styrene copolymer particles 122 and a material for forming the binder matrix 121. The material for forming the binder matrix 121 is curable by ionizing radiation. The method also includes a process of curing the material for forming the binder matrix 121 by ionizing radiation. Through these process steps, an antiglare layer 120 can be formed on the first transparent substrate 110.

The first transparent substrate 110 of the embodiment of the present invention can be made of, for example, a glass or a plastic film. Any plastic film having adequate transparency and mechanical strength may be used. Examples of such plastic film include films of polyethylene terephthalate (PET), triacetyl cellulose (TAC), diacetyl cellulose, acetyl-cellulose butylate, polyethylene naphthalate (PEN), cycloolefin polymers, polyimide, polyether sulfone (PES), polymethyl methacrylate (PMMA), polycarbonate (PC), and the like. Among these films, a triacetyl cellulose film may be suitable for its small birefringence and high transparency capabilities. In the case where the antiglare film 100 of the embodiment of the present invention is provided on the surface of a liquid crystal display, it is preferred that triacetyl cellulose be used for the first transparent substrate 110.

The thickness of the first transparent substrate 110 is preferably not less than 20 μm and not greater than 200 μm, and more preferably, not less than 20 μm and not greater than 100 μm. In some cases, if a transparent substrate having a measure of birefringence, such as PET, is used, the transparent substrate is preferably made suitably thin to minimize the influence of the birefringence.

The coating liquid for forming the antiglare layer 120 preferably includes a material for forming the binder matrix 121, which is curable by ionizing radiation, and acrylic-styrene copolymer particles 122.

As an example, an acrylic material that is an ionizing radiation curable material can be used as the material for forming the binder matrix 121. Examples of such acrylic material include monofunctional or polyfunctional (meth) acrylate compounds such as acrylic or methacrylic esters of polyhydric alcohols, and polyfunctional urethane (meth) acrylate compounds that are synthesized from a diisocyanate, a polyhydric alcohol, and a hydroxyl ester of acrylic acid or methacrylic acid. Examples of the ionizing radiation curable material include polyether resins, polyester resins, epoxy resins, alkyd resins, spiroacetal resins, polybutadiene resins, polythiol polyen resins, and the like, each having an acrylate functional group.

In the embodiment of the present invention, the term "(meth)acrylate" refers to both "acrylate" and "methacrylate". For example, "urethane (meth)acrylate" refers to both "urethane acrylate" and "urethane methacrylate".

Examples of monofunctional (meth)acrylate compounds include 2-hydroxyethyl(meth)acrylate, 2-hydroxypropyl (meth)acrylate, 2-hydroxybutyl(meth)acrylate, n-butyl (meth)acrylate, isobutyl(meth)acrylate, t-butyl(meth)acrylate, glycidyl(meth)acrylate, acryloyl morpholine, N-vinyl pyrrolidone, tetrahydrofurfuryl acrylate, cyclohexyl(meth) acrylate, 2-ethylhexyl(meth)acrylate, isobornyl(meth)acrylate, isodecyl(meth)acrylate, lauryl(meth)acrylate, tridecyl (meth)acrylate, cetyl(meth)acrylate, stearyl(meth)acrylate, benzyl(meth)acrylate, 2-ethoxyethyl(meth)acrylate, 3-methoxybutyl(meth)acrylate, ethylcarbitol(meth)acrylate, phosphoric acid (meth)acrylate, ethylene oxide-modified phosphoric acid (meth)acrylate, phenoxy(meth)acrylate, ethylene oxide-modified phenoxy(meth)acrylate, propylene oxide-modified phenoxy(meth)acrylate, nonylphenol(meth)acrylate, ethylene oxide-modified nonylphenol(meth)acrylate, propylene oxide-modified nonylphenol(meth)acrylate, methoxydiethylene glycol(meth)acrylate, methoxypolyethylene glycol(meth)acrylate, methoxypropylene glycol(meth)acrylate, 2-(meth)acryloyloxyethyl-2-hydroxypropyl phthalate, 2-hydroxy-3-phenoxypropyl(meth)acrylate, 2-(meth)acryloyloxyethyl hydrogen phthalate, 2-(meth)acryloyloxypropyl hydrogen phthalate, 2-(meth)acryloyloxypropyl hexahydrohydrogen phthalate, 2-(meth)acryloyloxypropyl tetrahydrohydrogen phthalate, dimethylaminoethyl(meth) acrylate, trifluoroethyl(meth)acrylate, tetrafluoropropyl (meth)acrylate, hexafluoropropyl(meth)acrylate, octafluoropropyl(meth)acrylate, adamantine derivative mono(meth) acrylates such as admantyl acrylate having monovalent mono (meth)acrylate derived from 2-adamantane and adamantanediol.

Examples of difunctional (meth)acrylate compounds include di(meth)acrylates such as ethylene glycol di(meth) acrylate, diethylene glycol di(meth)acrylate, butanediol di(meth)acrylate, hexanediol di(meth)acrylate, nonandiol di(meth)acrylate, ethoxylated hexanediol di(meth)acrylate, propoxydized hexanediol di(meth)acrylate, polyethylene glycol di(meth)acrylate, tripropylene glycol di(meth)acrylate, polypropylene glycol di(meth)acrylate, neopentyl glycol di(meth)acrylate, ethoxylated neopentyl glycol di(meth) acrylate, tripropylene glycol di(meth)acrylate, and hydroxypyvalic acid neopentyl glycol di(meth)acrylate.

Examples of (meth)acrylate compounds having a functionality equal to or greater than three include: trifunctional (meth)acrylate compounds such as tri(meth)acrylates, e.g., trimethylolpropane tri(meth)acrylate, ethoxylated trimethylolpropane tri(meth)acrylate, propoxydized trimethylolpropane tri(meth)acrylate, tris(2-hydroxyethyl)isocyanurate tri (meth)acrylate, and glycerin tri(meth)acrylate, pentaerythritol tri(meth)acrylate, dipentaerythritol tri(meth) acrylate, and ditrimethylolpropane tri(meth)acrylate; multifunctional (meth)acrylate compounds having a functionality equal to or greater than three, such as pentaerythritol tetra (meth)acrylate, ditrimethylolpropane tetra(meth)acrylate, dipentaerythritol tetra(meth)acrylate, dipentaerythritol penta (meth)acrylate, ditrimethylolpropane penta(meth)acrylate, dipentaerythritol hexa(meth)acrylate, and ditrimethylolpropane hexa(meth)acrylate; and multifunctional (meth)acrylate compounds in which some of (meth)acrylates are substituted with an alkyl group or ϵ-caprolactone.

Examples of urethane(meth)acrylate compounds include compounds obtained by reacting a polyhydric alcohol, a polyisocyanate, and an acrylate containing a hydroxyl group. Specific examples of the compounds include: UA-306H, UA-306T, UA-306I, and the like manufactured by Kyoeisha Chemical Co., Ltd.; UV-1700B, UV-6300B, UV-7600B, UV-7605B, UV-7640B, UV-7650B, and the like manufactured by Nippon Synthetic Chemical Industry Co., Ltd.; U-4HA, U-6HA, UA-100H, U-6LPA, U-15HA, UA-32P, U-324A, and the like manufactured by Shin-Nakamura Chemical Co., Ltd.; Ebecryl-1290, Ebecryl-1290K, Ebecryl-5129, and the like manufactured by Daicel-Cytec Company Ltd.; and UN-3220HA, UN-3220HB, UN-3220HC, UN-3220HS, and the like manufactured by Negami Chemical Industrial Co., Ltd.

The antiglare layer 120 of the antiglare film 100 of the embodiment of the present invention preferably includes an acrylic material having a hydroxyl group, as a material for forming the binder matrix 121. Examples of an acrylic material having a hydroxyl group include hydroxyethyl acrylate, hydroxyethyl methacrylate, pentaerythritol triacrylate, and dipentaerythritol pentaacrylate. Among these materials, pentaerythritol triacrylate is most preferable.

In the case where ultraviolet radiation is used as ionizing radiation, a photopolymerization initiator is added to the coating liquid for forming the antiglare layer 120. The photopolymerization initiator constitutes a part of the material for forming the binder matrix 121. A photopolymerization initiator that conforms to the material for forming the binder matrix 121 is preferably used. Examples of the photopolymerization initiator include benzoin and alkyl ethers thereof such as benzoin methyl ether, benzoin ethyl ether, benzoin isopropyl ether, and benzyl methyl ketal. The usage of the photopolymerization initiator is 0.5 to 20 parts by weight relative to the binder matrix forming material, and preferably, 1 to 5 parts by weight.

Moreover, a thermoplastic resin or the like may be added as a material for forming the binder matrix 121, in addition to the acrylic material that is curable by ionizing radiation. Examples of a suitable thermoplastic resin include: cellulose derivatives such as acetyl cellulose, nitrocellulose, acetylbutyl cellulose, ethyl cellulose, and methyl cellulose; vinyl resins such as vinyl acetate and copolymers thereof, vinyl chloride and copolymers thereof, and vinylidene chloride and copolymers thereof; acetal resins such as polyvinyl formal and polyvinyl butyral; acrylic-based resins such as acrylic resins and copolymers thereof and methacrylic resins and copolymers thereof; polystyrene resins; polyamide resins; linear polyester resins; and polycarbonate resins. The thermoplastic resin included in the antiglare layer 120 improves the adhesion between the first transparent substrate 110 and the antiglare layer 120. Further, the thermoplastic resin included in the antiglare layer 120 inhibits curling of the antiglare film 100.

Copolymer particles of methyl methacrylate (MMA) and styrene can be used as an example of the acrylic-styrene copolymer particles 122 of the antiglare layer 120 of the embodiment of the present invention. Particulate copolymer of MMA and styrene can be obtained by performing suspension polymerization using, as starting materials, MMA and styrene, which are monomers. By varying the weight ratio of MMA (refractive index of 1.49) to styrene (refractive index of 1.59), which are the starting materials, acrylic-styrene copolymer particles 122 of MMA and styrene with varied refractive indexes can be obtained.

The average diameter of the acrylic-styrene copolymer particles 122 is preferably not less than 1.5 μm and not greater than 10 μm, and more preferably, not less than 3.0 μm and not greater than 6.0 μm. If the average diameter is greater than 10 μm, concavities and convexities increase in size, and excessive concavities and convexities form on the surface of the antiglare layer 120, resulting in a reduction in contrast. In addition, the thickness of the antiglare layer 120 becomes more than desirable or suitable to obtain adequate concavities and convexities. If the average diameter is less than 1.5 μm, sufficient antiglare property for a liquid crystal display cannot be obtained.

If necessary or desired, a solvent may be added to the coating liquid for forming the antiglare layer 120. For example, a solvent may be added so that the acrylic-styrene copolymer particles 122 and the binder matrix 121 can be dispersed more uniformly. When the coating liquid for forming the antiglare layer 120 is applied on the first transparent substrate 110, the viscosity of the coating liquid can be adjusted within an adequate range.

In the embodiment of the present invention, triacetyl cellulose is used as the first transparent substrate 110, and the antiglare layer 120 is directly formed on the triacetyl cellulose film as the first transparent substrate 110 without other functional layers being interposed therebetween. In the case where the antiglare layer 120 is directly formed, it is preferred that a a mixed solvent of a solvent that dissolves or swells the triacetyl cellulose film and a solvent that neither dissolves nor swells the triacetyl cellulose film be used as the solvent of the coating liquid for foaming the antiglare layer 120. By using such a mixed solvent, it is possible to provide an antiglare film 100 having sufficient adhesion at the interface of the triacetyl cellulose film (first transparent substrate 110) and the antiglare layer 120.

Examples of a solvent that dissolves or swells the triacetyl cellulose film (first transparent substrate 110) include: ethers such as dibutylether, dimethoxymethane, dimethoxyethane, diethoxyethane, propylene oxide, dioxane, dioxolane, trioxane, tetrahydrofuran, anisole, and phenetol; some ketones such as acetone, methyl ethyl ketone, diethyl ketone, dipropyl ketone, diisobutyl ketone, cyclopentanone, cyclohexanone, methyl cyclohexanone, and ethyl cyclohexanone; esters such as ethyl formate, propyl formate, n-pentyl formate, methyl acetate, ethyl acetate, methyl propionate, ethyl propionate, n-pentyl acetate, and γ-butyrolactone; and cellosolves such as methyl cellosolve, cello solve, butyl cellosolve, and cellosolve acetate. These solvents may be used solely, or two or more types thereof may be used in combination.

Examples of a solvent that neither dissolves nor swells the triacetyl cellulose film include: aromatic hydrocarbons such as toluene, xylene, cyclohexane, and cyclohexylbenzene; hydrocarbons such as n-hexane; and some ketones such as methyl isobutyl ketone and methyl butyl ketone. These solvents may be used solely, or two or more types thereof may be used in combination.

In the antiglare layer 120 of the embodiment of the present invention, the binder matrix 121 may contain an additive called a surface conditioner to prevent occurrence of coating defects such as repelling and unevenness in the antiglare layer (coating film) 120 that is formed by application. The surface conditioner is added to the coating liquid for forming the antiglare layer 120, and constitutes a part of the material for forming the binder matrix 121. The surface conditioner is also called, depending on its function, a leveling agent, an antifoaming agent, an interface tension conditioner, or a surface tension conditioner, but any of these agents functions to decrease the surface tension of the coating film (antiglare layer 120) to be formed.

Examples of additives that may be used as the surface conditioner include silicone additives, fluorinated additives, and acrylic additives. Examples of silicone additives include derivatives having polydimethylsiloxane as a base structure, in which a side chain of the polydimethylsiloxane structure is modified. For example, polyether-modified dimethylsiloxane may be used as a silicone additive. Examples of fluorinated additives include compounds having a perfluoroalkyl group. Examples of acrylic additives include those having a base structure obtained by polymerizing an acryl monomer, a methacryl monomer, and/or a styrene monomer. The acrylic additives may include, in a side chain, an alkyl group, a polyether group, a polyester group, a hydroxyl group and/or an epoxy group, in addition to the base structure obtained by polymerizing an acryl monomer, a methacryl monomer, and/or a styrene monomer.

In addition to the above-described surface conditioner, functional additives having other functions may be added to the coating liquid for forming the antiglare layer 120 of the embodiment of the present invention. These functional additives are included in the binder matrix 121, and constitute a part of the antiglare layer 120. However, it is preferred that these functional additives do not adversely affect the transparency and light diffusing property of the antiglare layer 120. Examples of such functional additives include an antistat, an ultraviolet absorber, an infrared absorber, an antifouling agent, a water repellant, a refractive index adjuster, an adhesion improver, and a curing agent. These functional additives allow the resultant antiglare layer 120 to have functions other than the antiglare function, such as an antistatic function, an ultraviolet absorption function, an infrared absorption function, an antifouling function, and a water repellent function.

The coating liquid for forming the antiglare layer 120 of the embodiment of the present invention is applied on the first transparent substrate 110 to form a coating film. A coating method using a roll coater, a reverse roll coater, a gravure coater, a knife coater, a bar coater, or a die coater may be used in a method for applying the coating liquid for forming the antiglare layer 120 on the first transparent substrate 110. Among these coaters, it is preferable to use a die coater because of its capability of high-speed roll-to-roll coating. The solid content concentration of the coating liquid depends on the coating method. The solid content concentration ma be about 30 by weight to about 70% by weight.

Figure 2:
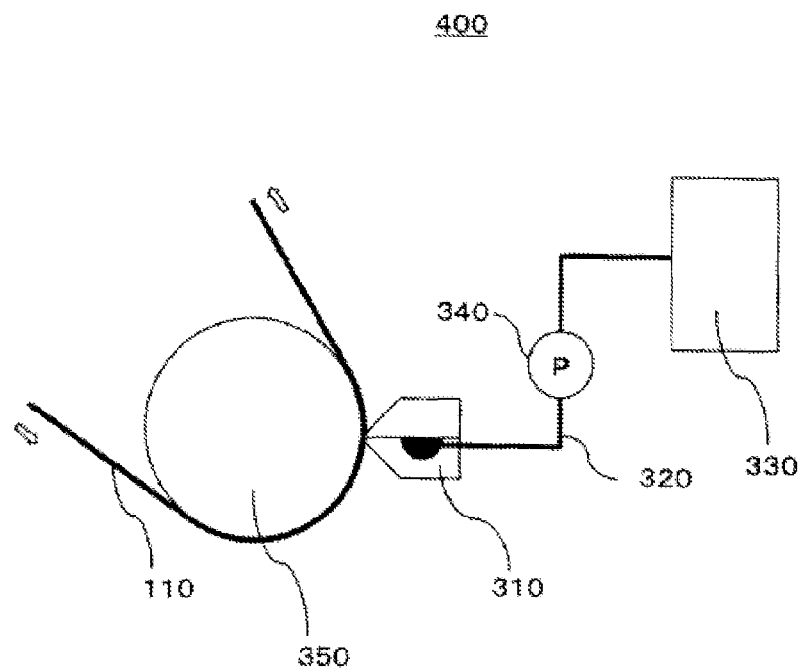
FIG. 2 shows a schematic cross-sectional view of a die coater type coating apparatus according to Embodiment 2 of the present invention.

Next, a die coater type coating apparatus according to Embodiment 2 of the present invention will be described. FIG. 2 shows a schematic cross-sectional view of the die coater type coating apparatus 400 according to Embodiment 2 of the present invention. As shown in FIG. 2, in the die coater type coating apparatus 400 of Embodiment 2 of the present invention, a die head 310 and a coating liquid tank 330 are connected to each other by a pipe 320. The coating liquid for forming the antiglare layer 120, which is stored in the coating liquid tank 330, is transferred into the die head 310 by a transfer pump 340. The coating liquid for forming the antiglare layer 120 having been transferred to the die head 310 is discharged from a slit gap of the die head 310, and thereby a coating film is formed on the first transparent substrate 110. By using a rolled-up substrate as the first transparent substrate 110 and feeding the substrate using a rotary roll 350, a coating film can be formed continuously on the first transparent substrate 110 by a roll-to-roll process.

The coating film, which has been obtained by applying, on the first transparent substrate 110, the coating liquid for forming the antiglare layer including an ionizing radiation curable material, is exposed to ionizing radiation to cure the coating film, and thus the antiglare layer 120 is formed. Ultraviolet rays or electron beams can be used for the ionizing radiation. In the case of ultraviolet-ray curing, examples of suitable light sources include a high-pressure mercury lamp, a low-pressure mercury lamp, an ultrahigh-pressure mercury lamp, a metal halide lamp, a carbon arc, and a xenon arc. In the case of electron-beam curing, electron beams emitted from various electron beam accelerators can be used. Examples of suitable electron beam accelerators include a Cockroft-Walton accelerator, a Van de Graaff accelerator, a resonance transformer-type accelerator, an insulating core transformer-type accelerator, a linear accelerator, a dynamitron accelerator, and a high-frequency accelerator. The electron beams preferably have energies of 50 KeV to 1000 KeV and more preferably, 100 KeV to 300 KeV.

After the coating film is formed by application of the coating liquid for forming the antiglare layer, a drying process may be provided before or after the process of forming the antiglare layer 120 by curing the coating film with ionizing radiation or the like. Curing and drying of the coating film may be performed simultaneously. In particular, if the coating liquid for forming the antiglare layer 120 includes a solvent in addition to the material of the binder matrix 121 and the acrylic-styrene copolymer particles 122, a drying process should be performed before exposure of the coating film to ionizing radiation in order to more efficiently remove the solvent from the formed coating film. Examples of drying means include heating, air blowing, and hot air blowing.

The antiglare film 100 manufactured by the above-described method has an antiglare property and a high contrast, and suppresses glare at a high level.

Next, an image display device incorporating the antiglare film of the embodiment of the present invention will be described. Although a transmissive liquid crystal display is described below, the antiglare film 100 of the embodiment of the present invention can be provided not only on the surface of a transmissive liquid crystal display but also on the surface of windows and on the surface of displays such as a CRT display, an electroluminescent display (ELD), a plasma display (PDP), a surface emission display (SED), and a field emission display (FED).

Figure 3:
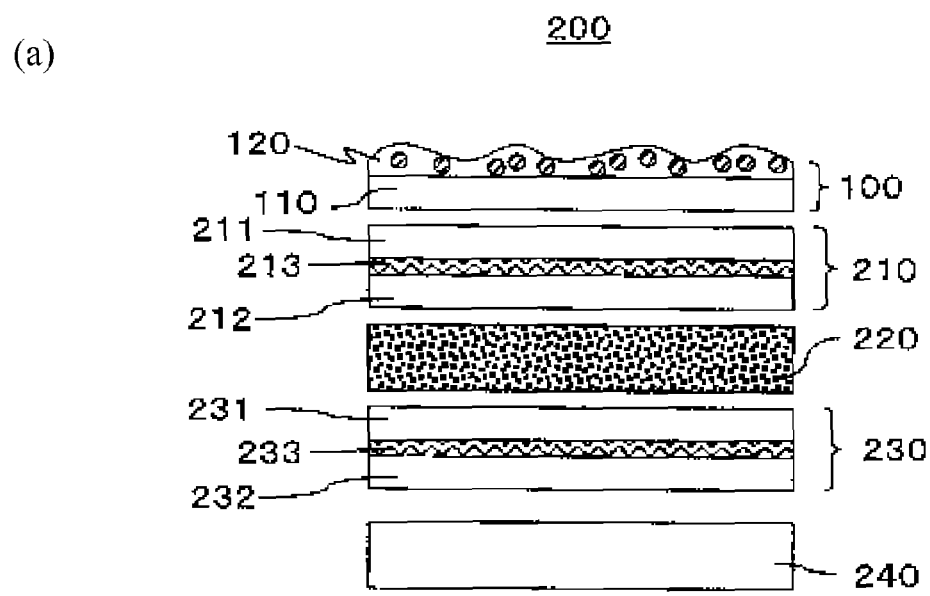
FIG. 3 shows schematic cross-sectional views of transmissive liquid crystal displays using the antiglare film of the present invention, according to Embodiments 3 and 4 of the present invention.
Figure 3:
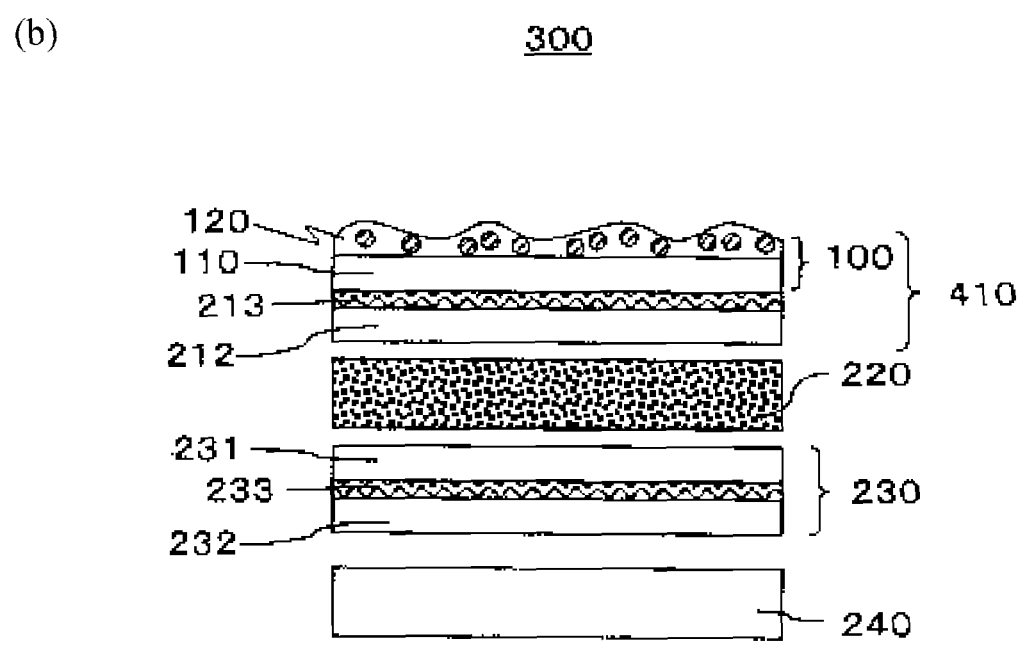

FIGS. 3(a) and 3(b) show transmissive liquid crystal displays 200 and 300, respectively, using the antiglare film 100 of Embodiment 1 of the present invention. As shown in FIG. 3(a), the transmissive liquid crystal display 200 according to Embodiment 3 of the present invention includes the antiglare film 100, a first polarizing plate 210, a liquid crystal cell 220, a second polarizing plate 230, and a backlight unit 240. The antiglare film 100 is on the observer side, that is, on the display surface side.

The backlight unit 240 includes a light source and a light diffusion plate, although not shown in the figure. The liquid crystal cell 220 has a structure in which an electrode is provided on one transparent substrate while an electrode and a color filter are provided on the other transparent substrate, and a liquid crystal is sealed between the two electrodes, although not shown in the figure. The first polarizing plate 210 and the second polarizing plate 230 are provided so as to sandwich the liquid crystal cell 220. The first polarizing plate 210 has a structure in which a first polarizing layer 213 is sandwiched between a second transparent substrate 211 and a third transparent substrate 212. The second polarizing plate has a structure in which a second polarizing layer 233 is sandwiched between a fourth transparent substrate 231 and a fifth transparent substrate 232. Thus, the transmissive liquid crystal display 200 has a structure in which the first transparent substrate 110 as a component of the antiglare film 100 and the second transparent substrate 211 as a component of the first polarizing plate 210 are provided separately from each other.

As shown in FIG. 3(b), the transmissive liquid crystal display 300 according to Embodiment 4 of the present invention includes an antiglare polarizing plate 410, a liquid crystal cell 220, a second polarizing plate 230, and a backlight unit 240. The antiglare polarizing plate 410 has a structure in which a first polarizing layer 213 is sandwiched between the antiglare film 100 of the present invention and a third transparent substrate 212. The first polarizing layer 213 is provided on the surface of the first transparent substrate 110 of the antiglare film 100, on which the antiglare layer 120 is not provided. That is, the first transparent substrate 110 also serves as the second transparent substrate 211, in contrast to the transmissive liquid crystal display of Embodiment 3.

The same material as that of the first transparent substrate can be used for the second to fifth transparent substrates 211, 212, 231, and 232. For example, stretched polyvinyl alcohol (PVA) having iodine added thereto can be used as the first polarizing layer 213 and the second polarizing layer 233.

The transmissive liquid crystal displays 200 and 300 according to Embodiments 3 and 4 of the present invention may include other functional elements. Examples of such functional elements include a diffusion film, a prism sheet, and a luminance-increasing film for effectively using light emitted from the backlight; and a phase difference film for compensating a phase difference of the liquid crystal cell or the polarizing plate. However, the transmissive liquid crystal displays 200 and 300 according to the embodiments of the present invention are not limited thereto.

The transmissive liquid crystal displays 200 and 300 using the antiglare film 100 of Embodiment 1 of the present invention each have a high antiglare property, suppress glare, and also suppress a reduction in contrast. In other words, the transmissive liquid crystal displays 200 and 300 having excellent visibility can be obtained.

EXAMPLES

Hereinafter, the present invention will be described in detail using examples and comparative examples.

As an example, an antiglare film having the structure shown in FIG. 1 was manufactured. A triacetyl cellulose film (TD-80U manufactured by Fuji Photo Film Co., Ltd.) was used as the first transparent substrate 110. The coating liquid for forming the antiglare layer 120 was composed of: 25 parts by weight of pentaerythritol triacrylate (PE3A (acrylic material 1)) having a hydroxyl group in a molecule, and 69.5 parts by weight of dipentaerythritol hexaacrylate (acrylic material 2) having no hydroxyl group in a molecule as materials for forming the binder matrix 121; 5.0 parts by weight of Irgacure 184 (manufactured by Ciba Japan K.K.) as a polymerization initiator; and 0.5 parts by weight of BYK350 (manufactured by BYK-Chemie Japan K.K.) which is an acrylic additive, as a surface conditioner. Further, 18.0 parts by weight of acrylic-styrene copolymer particles 122 having an average diameter of 6.0 μm and a refractive index of 1.535 were used as the acrylic-styrene copolymer particles 122. As a solvent, a mixed solvent of 30 parts by weight of dioxolan and 70 parts by weight of toluene was used. The acrylic-styrene copolymer particles 122 are copolymer particles of methyl methacrylate (MMA) and styrene.

The coating liquid for forming the antiglare layer 120, which was prepared by mixing the materials for forming the binder matrix 121, the acrylic-styrene copolymer particles 122, and the solvent, was applied on the triacetyl cellulose film as the first transparent substrate 110 by using the die coater type coating apparatus 400, thereby forming a coating film. The coating film thus formed was dried to remove the solvent included in the coating film. Thereafter, the coating film was cured by exposure to 250 mJ/cm$^2$ of ultraviolet radiation using a high pressure mercury lamp, thereby manufacturing an antiglare film 100 having a 9 μm thick antiglare layer 120 on the transparent substrate 110 (triacetyl cellulose film).

A variety of coating liquids for forming the antiglare layer 120 were prepared for Examples 2 to 8 and Comparative Examples 1 to 15 by using, as materials for forming the binder matrix 121, not only pentaerythritol triacrylate (PE3A (acrylic material 1)) having a hydroxyl group in a molecule but also monomer 1 (acrylic material 2) having no hydroxyl group in a molecule, and varying the mixing ratio thereof, and the average diameter $R_A$, refractive index $n_A$, and additive amount $w_A$ of the acrylic-styrene copolymer particles 122. Table 1 shows the compositions of these coating liquids for forming the antiglare layer. Using these coating liquids for forming the antiglare layer 120, antiglare films 100 and antiglare films for comparison, each having an antiglare layer on a triacetyl cellulose film (first transparent substrate 110), were manufactured in a similar manner to Example 1. Note that no pentaerythritol triacrylate (PE3A (acrylic material 1)) was used for Comparative Example 15.

The average thickness H of the antiglare layer according to each of Examples and Comparative Examples was measured using an electronic micrometer (K351C manufactured by Anritsu Corp.). The average diameter $R_A$ of the acrylic-styrene copolymer particles 122 was measured using a light-scattering particle size distribution analyzer (SALD-7000 manufactured by Shimadzu Corp). The refractive index $n_A$ of the acrylic-styrene copolymer particles 122 was measured by the Becke line detecting method (immersion method). The refractive index $n_M$ of the binder matrix 121 was measured by the Becke line detecting method (immersion method) using a sample which was obtained by applying the material for forming the binder matrix 121, to which no acrylic-styrene copolymer particles 122 were added, on the transparent substrate, and subjecting the resultant film to drying and curing with ultraviolet-ray radiation. Table 1 also shows the average thickness H of each antiglare layer, the average diameter $R_A$ of the acrylic-styrene copolymer particles 122, the refractive index $n_M$ of the binder matrix 121, and the refractive index $n_A$ of the acrylic-styrene copolymer particles.

TABLE 1

| | Binder Matrix Forming Material | | | | | |
|---|---|---|---|---|---|---|
| | Acrylic Material 1 PE3A (parts by weight) | Acrylic Material 2 DPHA (parts by weight) | Polymerization Initiator Irgacure 184 (parts by weight) | Acrylic Additive BYK350 (parts by weight) | Total Weight $w_M$ (parts by weight) | Refractive Index of Binder Matrix $n_M$ |
| Example 1 | 25.0 | 69.5 | 5.0 | 0.5 | 100.0 | 1.520 |
| Comparative Example 1 | 25.0 | 69.5 | 5.0 | 0.5 | 100.0 | 1.520 |
| Comparative Example 2 | 25.0 | 69.5 | 5.0 | 0.5 | 100.0 | 1.520 |
| Comparative Example 3 | 25.0 | 69.5 | 5.0 | 0.5 | 100.0 | 1.520 |

TABLE 1-continued

| | | | | | | |
|---|---|---|---|---|---|---|
| Comparative Example 4 | 25.0 | 69.5 | 5.0 | 0.5 | 100.0 | 1.520 |
| Example 2 | 25.0 | 69.5 | 5.0 | 0.5 | 100.0 | 1.520 |
| Comparative Example 5 | 25.0 | 69.5 | 5.0 | 0.5 | 100.0 | 1.520 |
| Example 3 | 25.0 | 69.5 | 5.0 | 0.5 | 100.0 | 1.520 |
| Comparative Example 6 | 25.0 | 69.5 | 5.0 | 0.5 | 100.0 | 1.520 |
| Comparative Example 7 | 25.0 | 69.5 | 5.0 | 0.5 | 100.0 | 1.520 |
| Example 4 | 25.0 | 69.5 | 5.0 | 0.5 | 100.0 | 1.520 |
| Comparative Example 8 | 25.0 | 69.5 | 5.0 | 0.5 | 100.0 | 1.520 |
| Comparative Example 9 | 25.0 | 69.5 | 5.0 | 0.5 | 100.0 | 1.520 |
| Comparative Example 10 | 25.0 | 69.5 | 5.0 | 0.5 | 100.0 | 1.520 |
| Example 5 | 25.0 | 69.5 | 5.0 | 0.5 | 100.0 | 1.520 |
| Comparative Example 11 | 25.0 | 69.5 | 5.0 | 0.5 | 100.0 | 1.520 |
| Example 6 | 25.0 | 69.5 | 5.0 | 0.5 | 100.0 | 1.520 |
| Comparative Example 12 | 25.0 | 69.5 | 5.0 | 0.5 | 100.0 | 1.520 |
| Comparative Example 13 | 25.0 | 69.5 | 5.0 | 0.5 | 100.0 | 1.520 |
| Example 7 | 25.0 | 69.5 | 5.0 | 0.5 | 100.0 | 1.520 |
| Comparative Example 14 | 25.0 | 69.5 | 5.0 | 0.5 | 100.0 | 1.520 |
| Example 8 | 25.0 | 69.5 | 5.0 | 0.5 | 100.0 | 1.520 |
| Comparative Example 15 | — | 94.5 | 5.0 | 0.5 | 100.0 | 1.520 |

| | Acrylic-styrene Copolymer Particles | | | Solvent | | Average Thickness of |
|---|---|---|---|---|---|---|
| | Particle Diameter $R_A$ (μm) | $w_A$ (parts by weight) | Refractive Index $n_A$ | Dioxolan (parts by weight) | Toluene (parts by weight) | Antiglare Layer H (μm) |
| Example 1 | 6.0 | 18.0 | 1.535 | 30 | 70 | 9.0 |
| Comparative Example 1 | 5.0 | 4.0 | 1.495 | 30 | 70 | 8.5 |
| Comparative Example 2 | 5.0 | 18.0 | 1.505 | 30 | 70 | 12.0 |
| Comparative Example 3 | 4.0 | 4.0 | 1.525 | 30 | 70 | 6.5 |
| Comparative Example 4 | 6.0 | 12.0 | 1.565 | 30 | 70 | 9.0 |
| Example 2 | 4.0 | 9.0 | 1.580 | 30 | 70 | 7.5 |
| Comparative Example 5 | 4.0 | 2.0 | 1.565 | 30 | 70 | 7.5 |
| Example 3 | 5.0 | 4.0 | 1.495 | 30 | 70 | 7.5 |
| Comparative Example 6 | 5.0 | 4.0 | 1.495 | 30 | 70 | 20.0 |
| Comparative Example 7 | 3.0 | 4.0 | 1.495 | 30 | 70 | 12.0 |
| Example 4 | 5.0 | 9.0 | 1.505 | 30 | 70 | 8.5 |
| Comparative Example 8 | 5.0 | 9.0 | 1.505 | 30 | 70 | 5.0 |
| Comparative Example 9 | 5.0 | 6.0 | 1.495 | 30 | 70 | 5.0 |
| Comparative Example 10 | 5.0 | 12.0 | 1.550 | 30 | 70 | 5.0 |
| Example 5 | 5.0 | 9.0 | 1.495 | 30 | 70 | 7.5 |
| Comparative Example 11 | 5.0 | 18.0 | 1.495 | 30 | 70 | 10.0 |
| Example 6 | 4.5 | 9.0 | 1.545 | 30 | 70 | 7.5 |
| Comparative Example 12 | 4.5 | 12.0 | 1.545 | 30 | 70 | 13.0 |
| Comparative Example 13 | 4.5 | 4.0 | 1.545 | 30 | 70 | 6.0 |
| Example 7 | 3.5 | 10.0 | 1.555 | 30 | 70 | 7.5 |
| Comparative Example 14 | 3.5 | 3.0 | 1.555 | 30 | 70 | 12.5 |
| Example 8 | 4.5 | 18.0 | 1.510 | 30 | 70 | 10.0 |
| Comparative Example 15 | 4.5 | 6.0 | 1.510 | 30 | 70 | 7.5 |

Next, "contrast", "glare", and "antiglare property" were evaluated for the antiglare films of the present invention obtained in Examples 1 to 8 and the antiglare films for comparison obtained in Comparative Examples 1 to 15, according to the following method.

(Contrast)

The antiglare films of the present invention obtained in Embodiments 1 to 8 and the antiglare films for comparison obtained in Comparative Examples 1 to 15 were each attached to a liquid crystal monitor (FTD-W2023ADSR manufactured by BUFFALO INC.) with an adhesive, and luminance (white luminance) of the liquid crystal monitor at the time of white display and luminance (black luminance) thereof at the time of black display were measured using a luminous meter (LS-100 manufactured by Konica Minolta Holdings, Inc.). A value obtained by dividing the white luminance by the black luminance was the contrast. Measurement was performed under a dark-room condition and under a bright-room condition where lighting was controlled so that illuminance on a target antiglare film was 200 lux. The lowering rate of a value measured under the state where the antiglare film obtained in any of Examples 1 to 8 and Comparative Examples 1 to 15 was attached to the liquid crystal monitor from a value measured under the state where nothing was attached to the liquid crystal monitor was obtained. When the lowering rate was less than or equal to 3% under the dark-room condition and less than or equal to 45% under the bright-room condition, the evaluation result was represented by a "circle". When the lowering rate exceeded 3% under the dark-room condition and/or exceeded 45% under the bright-room condition, the evaluation result was represented by a "cross".

(Glare)

A black matrix (BM) glass plate having a pattern of 80 ppi to 200 ppi was placed on a light table having a fluorescent lamp embedded therein, and the antiglare films obtained in Examples 1 to 8 and Comparative Examples 1 to 15 were each placed on the glass plate to evaluate the level of glare. At this time, a maximum BM resolution among BM resolutions for which glare was hardly observed was used as a corresponding resolution. When the corresponding resolution was greater than or equal to 150 ppi, the evaluation result was represented by a "circle". When the corresponding resolution was less than 150 ppi, the evaluation result was represented by a "cross".

(Antiglare Property)

The antiglare films obtained in Example 1-8 and Comparative Example 1-15 were each adhered to a black plastic plate with an adhesive, and observed for visual evaluation at a point 1 m away from the antiglare film, from a direction perpendicular to the antiglare film. When the face of the observer was recognized on the film but this state was acceptable, the evaluation result was represeted by a "circle". When the face of the observer was clearly reflected on the film, the evaluation result was represented by a "cross".

Table 2 shows the results of evaluation for "contrast", "glare", and "antiglare property" of the antiglare films obtained in Examples 1 to 8 and Comparative Examples 1 to 15. Table 2 also shows the quotient $R_A/H$ which is obtained by dividing the average diameter $R_A$ of the acrylic-styrene copolymer particles 122 by the average thickness H of the antiglare layer 120, and the product $|n_A-n_M|\times w_A\times H$ which is the product of: the absolute value $|n_A-n_M|$ obtained by subtracting the average refractive index $n_M$ of the binder matrix 121 from the refractive index $n_A$ of the acrylic-styrene copolymer particles 122; the content $w_A$ of the acrylic-styrene copolymer particles 122 when the content of the binder matrix 121 in the antiglare layer 120 is 100 parts by weight; and the average thickness H of the antiglare layer 120.

TABLE 2

|  | $R_A/H$ | $|n_A-n_M|\times w_A\times H$ | Contrast | Glare | Antiglare Property |
|---|---|---|---|---|---|
| Example 1 | 0.67 | 2.43 | ○ | ○ | ○ |
| Comparative Example 1 | 0.77 | 0.65 | ○ | X | ○ |
| Comparative Example 2 | 0.42 | 3.24 | X | ○ | ○ |
| Comparative Example 3 | 0.62 | 0.13 | ○ | X | ○ |
| Comparative Example 4 | 0.67 | 4.86 | X | ○ | ○ |
| Example 2 | 0.53 | 2.70 | ○ | ○ | ○ |
| Comparative Example 5 | 0.53 | 0.67 | ○ | X | ○ |
| Example 3 | 0.67 | 0.75 | ○ | ○ | ○ |
| Comparative Example 6 | 0.25 | 2.00 | ○ | ○ | X |
| Comparative Example 7 | 0.25 | 1.20 | ○ | ○ | X |
| Example 4 | 0.59 | 1.15 | ○ | ○ | ○ |
| Comparative Example 8 | 1.00 | 0.68 | X | X | ○ |
| Comparative Example 9 | 1.00 | 0.75 | X | ○ | ○ |
| Comparative Example 10 | 1.00 | 1.80 | X | ○ | ○ |
| Example 5 | 0.67 | 1.69 | ○ | ○ | ○ |
| Comparative Example 11 | 0.50 | 4.50 | X | ○ | ○ |
| Example 6 | 0.60 | 1.69 | ○ | ○ | ○ |
| Comparative Example 12 | 0.35 | 3.90 | X | ○ | ○ |
| Comparative Example 13 | 0.75 | 0.60 | ○ | X | ○ |
| Example 7 | 0.47 | 2.62 | ○ | ○ | ○ |
| Comparative Example 14 | 0.28 | 1.31 | ○ | ○ | X |
| Example 8 | 0.45 | 1.80 | ○ | ○ | ○ |
| Comparative Example 15 | 0.60 | 0.45 | X | X | ○ |

When the antiglare films of the present invention manufactured in Examples 1 to 8 were compared with the antiglare films for comparison manufactured in Comparison Examples 1 to 15, it was discovered that the antiglare films of Examples 1 to 8 of the present invention had higher antiglare properties, suppressed glare, and had less reductions in contrast when provided on a display.

What is claimed is:

1. An antiglare film comprising:
a transparent substrate; and
an antiglare layer formed on the transparent substrate, the antiglare layer having a concave-convex structure on one side thereof, which side is opposite the side at which the antiglare layer is formed on the transparent substrate,
wherein the antiglare layer includes a binder matrix and acrylic-styrene copolymer particles, the binder matrix including an acrylic material having a hydroxyl group, and
wherein a quotient $R_A/H$ is within a range of 0.30 to 0.80, the quotient $R_A/H$ being obtained by dividing the average diameter $R_A$ of the acrylic-styrene copolymer particles by the average thickness H of the antiglare layer, and a product $|n_A-n_M|\times w_A\times H$ is within a range of 0.70 to 3.00, the product $|n_A-n_M|\times w_A\times H$ being the product of: the absolute value $|n_A-n_M|$ obtained by subtracting the average refractive index $n_M$ of the binder matrix from the refractive index $n_A$ of the acrylic-styrene copolymer particles; the content $w_A$ of the acrylic-styrene copolymer particles when the content $w_M$ of the binder matrix in the antiglare layer is 100 parts by weight; and the average thickness H of the antiglare layer, and
wherein the absolute value $|n_A-n_M|$ is not larger than 0.015.

2. The antiglare film according to claim 1, wherein the average thickness H of the antiglare layer is within a range of 3 μm to 30 μm.

3. The antiglare film according to claim 1, wherein the acrylic material having a hydroxyl group is pentaerythritol triacrylate, and the antiglare layer includes 18 parts by weight or more of the pentaerythritol triacrylate relative to 100 parts by weight of the binder matrix.

4. The antiglare film according to claim 2, wherein the acrylic material having a hydroxyl group is pentaerythritol triacrylate, and the antiglare layer includes 18 parts by weight or more of the pentaerythritol triacrylate relative to 100 parts by weight of the binder matrix.

5. A transmissive liquid crystal display having a backlight side and an observer side, comprising: the antiglare film according to claim 1, a first polarizing plate, a liquid crystal cell, a second polarizing plate, and a backlight unit in this order from the observer side to the backlight side, wherein the antiglare layer of the antiglare film is provided at the observer side.

6. A transmissive liquid crystal display having a backlight side and an observer side, comprising: the antiglare film according to claim 2, a first polarizing plate, a liquid crystal cell, a second polarizing plate, and a backlight unit in this order from the observer side to the backlight side, wherein the antiglare layer of the antiglare film is provided at the observer side.

7. A transmissive liquid crystal display having a backlight side and an observer side, comprising: the antiglare film according to claim 3, a first polarizing plate, a liquid crystal cell, a second polarizing plate, and a backlight unit in this order from the observer side to the backlight side, wherein the antiglare layer of the antiglare film is provided at the observer side.

8. A transmissive liquid crystal display having a backlight side and an observer side, comprising: the antiglare film according to claim 4, a first polarizing plate, a liquid crystal cell, a second polarizing plate, and a backlight unit in this order from the observer side to the backlight side, wherein the antiglare layer of the antiglare film is provided at the observer side.

9. An antiglare polarizing plate comprising:
the antiglare film according to claim 1;
a polarizing layer on the side of the transparent substrate that is opposite the side at which the antiglare layer is formed; and
a second transparent substrate on the polarizing layer.

10. An antiglare polarizing plate comprising:
the antiglare film according to claim 2;
a polarizing layer on the side of the transparent substrate that is opposite the side at which the antiglare layer is formed; and
a second transparent substrate on the polarizing layer.

11. An antiglare polarizing plate comprising:
the antiglare film according to claim 3;
a polarizing layer on the side of the transparent substrate that is opposite the side at which the antiglare layer is formed; and
a second transparent substrate on the polarizing layer.

12. An antiglare polarizing plate comprising:
the antiglare film according to claim 4;
a polarizing layer on the side of the transparent substrate that is opposite the side at which the antiglare layer is formed; and
a second transparent substrate on the polarizing layer.

13. A transmissive liquid crystal display having a backlight side and an observer side, comprising the antiglare polarizing plate according to claim 9, a liquid crystal cell, a second polarizing plate, and a backlight unit in this order from the observer side to the backlight side, wherein the antiglare layer of the antiglare polarizing plate is provided on the observer side.

14. The antiglare film according to claim 1, wherein
said $R_A/H$ is within a range of 0.45 to 0.67, and
said $|n_A - n_M| \times w_A \times H$ is within a range of 1.15 to 2.43.

15. The antiglare film according to claim 14, wherein
said $R_A$ is within a range of 4.5 μm to 6.0 μm,
said H is within a range of 8.5 μm to 10.0 μm, and
said $W_A$ is within a range of 9 parts by weight to 18 parts by weight.

16. The antiglare film according to claim 1, wherein when the antiglare film is attached to a liquid crystal monitor, lowering rates of contrast under a dark-room condition and under a bright-room condition of 200 lux are not higher than 3% and not higher than 45%, respectively.

17. A method for manufacturing an antiglare film, the method comprising: preparing a transparent substrate; forming a coating film by applying, on the transparent substrate, a coating liquid for forming an antiglare layer, the coating liquid including a binder matrix forming material, which is curable by ionizing radiation, and acrylic-styrene copolymer particles; and curing the binder matrix forming material with ionizing radiation to form the antiglare layer;
wherein a quotient $R_A/H$ is within a range of 0.30 to 0.80, the quotient $R_A/H$ being obtained by dividing the average diameter $R_A$ of the acrylic-styrene copolymer particles by the average thickness H of the antiglare layer, and a product $|n_A - n_M| \times w_A \times H$ is within a range of 0.70 to 3.00, the $|n_A - n_M| \times w_A \times H$ being the product of: the absolute value $|n_A - n_M|$ obtained by subtracting the average refractive index $n_M$ of the binder matrix from the refractive index $n_A$ of the acrylic-styrene copolymer particles; the content $w_A$ of the acrylic-styrene copolymer particles when the content $w_M$ of the binder matrix in the antiglare layer is 100 parts by weight; and the average thickness H of the antiglare layer, and
wherein the absolute value $|n_A - n_M|$ is not larger than 0.015.

18. The method for manufacturing an antiglare film according to claim 17, wherein the binder matrix includes pentaerythritol triacrylate, and the pentaerythritol triacrylate accounts for 18 parts by weight or more relative to 100 parts by weight of the binder matrix constituting a part of the antiglare layer.

19. The method for manufacturing an antiglare film according to claim 17, wherein the coating liquid for forming the antiglare layer is applied by using a die coater.

20. The method for manufacturing an antiglare film according to claim 18, wherein the coating liquid for forming the antiglare layer is applied by using a die coater.

* * * * *